March 29, 1966  D. J. MURPHY, JR  3,242,656

HIGH EFFICIENCY UNIT FILTER ASSEMBLY

Filed May 1, 1964

INVENTOR.
DAVID J. MURPHY, JR.

BY Ralph B. Quick
ATTORNEY

United States Patent Office 3,242,656
Patented Mar. 29, 1966

3,242,656
HIGH EFFICIENCY UNIT FILTER ASSEMBLY
David J. Murphy, Jr., Louisville, Ky., assignor to American Air Filter Company, Inc., Louisville, Ky., a corporation of Delaware
Filed May 1, 1964, Ser. No. 364,118
4 Claims. (Cl. 55—500)

This invention relates to unit type filters and more particularly to high efficiency unit filters of the pleated type.

In high efficiency unit filters, it long has been known in the art to construct a filter core of pleated filter material from a strip of filter medium folded upon itself at longitudinally spaced intervals. The folds of the pleats have been separated by corrugated spacer members extending into the pleats from opposite sides of the filter core to provide gas passages to the extended filtering surfaces. After the filter core has been formed it has been mounted in an open-ended frame and sealed therein with a suitable sealing material applied along the longitudinal edges of the core. This sealing of the core has proven to be a complex and difficult to accomplish operation and the resulting sealed structure has not always proven effective to withstand the vibrational and shock conditions to which the unit filter assembly has been exposed.

The present invention successfully avoids these aforementioned disadvantages, providing a high efficiency unit filter structure which is straightforward and economical in its construction, operation, and maintainability, and which is capable of withstanding a high degree of vibrational and shock stresses. Further, the present invention provides a unit filter assembly which is capable of long wear, avoiding previously known inherent tearing stresses on the filter medium.

Various other features of the present invention will become obvious to one skilled in the art upon reading the disclosure set forth herein.

More particularly, the present invention provides a filter comprising a strip of filter medium folded upon itself at longitudinally spaced intervals to provide a plurality of stacked pleats with successively alternating pleat fold-turns; a plurality of corrugated spacer members disposed within and extending along the lengths of the pleats to space the same; alternate spacer members having a breadth greater than the breadth of a spaced pleat immediately adjacent thereto with the longitudinally extending side edges of the alternate spacer members being folded upon themselves to engage the longitudinally extending side edges of an immediately adjacent pleat therebetween to form longitudinally extending edge seals therealong. In addition, the present invention provides U-shaped channel members extending across the breadth of the corrugated spacer members and engaging therewith at the edges adjacent the pleat fold-turns to round off the edges and avoid inherent tearing.

It is to be understood that various changes can be made in the arrangement, form and construction of the apparatus disclosed herein without departing from the scope or spirit of the present invention.

Referring to the drawing which discloses one advantageous embodiment of the present invention:

Figure 1:
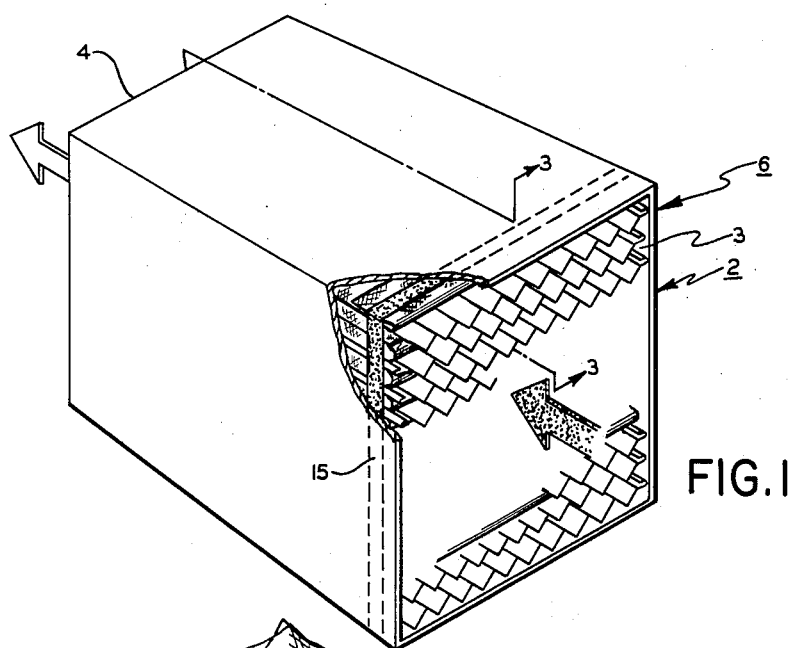
FIGURE 1 is a partially broken away perspective view of a unit filter assembly incorporating features of the present invention.

Referring to the drawing, the inventive filter assembly is disclosed as including open-ended rectangular housing 2 having upstream dirty gas inlet 3 and downstream clean gas outlet 4. Housing 2 can be made from any one of a number of known rigid, stable materials and, advantageously, it can be made of a preselected gauge metal or treated wood capable of withstanding high temperatures to which the filter assembly might be exposed.

Disposed within housing 2 and sized to extend fully between opposite walls thereof is filter core 6. Core 6 is comprised of a continuous strip of filter medium folded back and forth upon itself at longitudinally spaced intervals to provide a plurality of stacked pleats 7 with successively alternating pleat fold-turns 8. It is to be understood that any one of a number of known filter materials can be utilized in the invention filter assembly. Advantageously a filter medium having fibers of submicron diameter size capable of operating at efficiencies above ninety-nine percent (99%) can be utilized. For example, glass fiber filter medium having fiber diameters of approximately 0.7 micron to approximately 0.8 micron can be used, as can certain types of submicron organic filter medium materials.

Disposed within and extending along the length of the pleats to space the pleats and maintain them in open position to accommodate the dirty gas stream to be treated are a plurality of alternately arranged corrugated spacer members 9 and 11. It is to be noted that spacer members 9 and 11, as disclosed, are sized in length to extend slightly beyond the pleats at the open ends thereof; however, it is to be understood that the specific lengths of the spacer members can vary so long as the inlet and outlet passages formed by the spacer members in core 6 are maintained in open position. It further is to be noted that spacer members 9 have a breadth greater than the breadth of the pleats of filter medium immediately adall of the pleats containing spacer members 11 are sealed slightly less than the breadth of the pleat with which they cooperate. With such an arrangement, the opposite longitudinal edges 12 of spacer members 9 are each folded upon themselves (FIGURE 2) to engage the facing longitudinally extending side edges of the pleat forming planks which form an immediately adjacent pleat spaced by spacer member 11 to seal such side edges of the immediately adjacent pleat. As a result of this structural arrangement, a self-contained core 6 is formed when all of the pleats containing spaced members 11 are sealed along their side edges by edges 12 of respectively adjacent spacer members 9. It is to be understood that corrugated spacer members 9 and 11 can be made from any one of a number of suitably flexible, sturdy materials. For example, asbestos, chip board, or aluminum metal foil can be used. Advantageously, a thin thermoplastic material which can be heat sealed along the longitudinal edge portions thereof can be used for the spacer members, particularly members 9 with edges 12. When such a thermoplastic material is used, a heat sealing of the folded longitudinal edges serves to improve the over-all sealing effect of spacer members 9 with the respective pleats immediately adjacent thereto. Although in the disclosed embodiment of the invention the edges 12 of spacer members 9 are disclosed in an upturned fold sealing arrangement, it is to be understood that the sealing arrangement also can be accomplished as effectively by turning edges 12 downwardly to engage with the longitudinal edges of respective pleats immediately therebelow.

Figure 2:
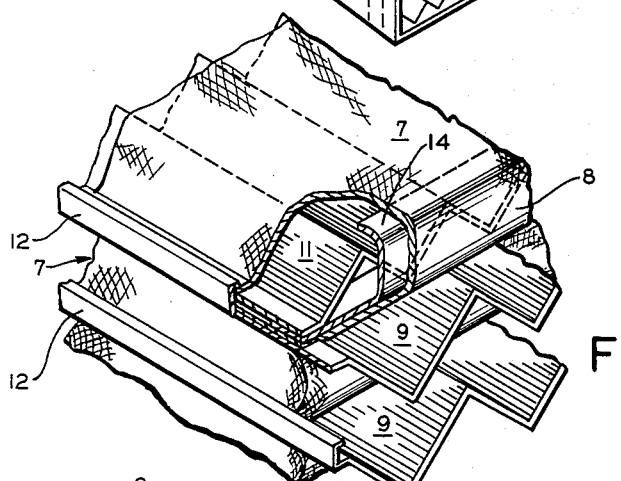
FIGURE 2 is an enlarged partially broken away fragmentary view of a part of the filter assembly of FIGURE 1.
Figure 3:
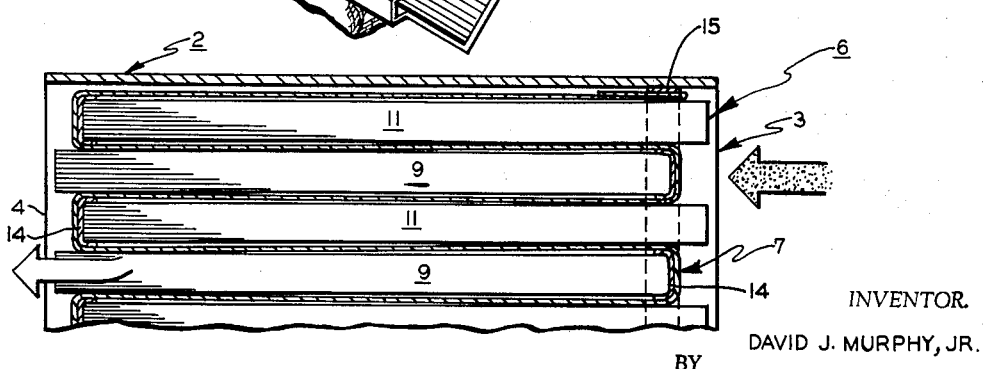
FIGURE 3 is an enlarged cross-sectional elevational view of a portion of the assembly of FIGURE 1 taken in a plane passing through line 3—3 of FIGURE 1.

As can be seen more clearly in FIGURES 2 and 3 of the drawing, extending across the breadth of and engaging the transverse edges of spacer members 11 and 9 adjacent successively alternating fold-turns 8 of pleated filter medium 6 are U-shaped channel members 14. Channel members 14 nest in fold-turns 8 to minimize wear and tear of the filter medium fold-turns which might otherwise occur because of the sharp transverse edges of the spacer members. The channel members 14 further give stability across the breadth of the pleat folds and hinder material sagging between the crests of the corrugations of the spacer member. It is to be understood that a suitable binder tape or any one of a number of suitably rigid, sturdy materials can be used to form the channel members 14. If desired, a material similar to that used for spacer members 9 and 11 also can be used for the channel members.

Once the strip of filter medium 6 has been folded upon itself at longitudinally spaced intervals with the folds of the pleats separated by spacer members 9 and 11 and the longitudinal edges 12 of spacer members 9 turned upon themselves to seal the longitudinal pleat edges of the pleats spaced by spacer members 11 so as to form finished core 6, core 6 is then prepared for insertion into open-ended housing 2. In order to fix core 6 in housing 2 in sealed relationship therewith so that incoming dirty gas does not bypass the core, a sealant 15 is provided between the upstream surrounding perimeter of core 6 and the inner upstream perimeter of housing 2 adjacent inlet 3. Sealant 15 can be formed from any one of a number of known gas impervious adhesives such as plastic, ceramic or rubber base adhesive materials. The seal can be formed by applying the sealant in an unset stage around the upstream inner perimeter of housing 2 and then inserting core 6 from the downstream end of the housing until its upstream end engages the unset sealant material. The core can be held in that position and additional sealant material applied if necessary at the corners of the core to insure a gas pervious seal. The sealant material then is allowed to set with the core 6 in such position in housing 2. It is to be noted that with this arrangement, sealing is required only between the upstream outer perimeter of core 6 and the upstream inner perimeter of housing 2 since the upturned longitudinal edges 12 of spacer members 9 aforedescribed serve to seal the longitudinal edges of the pleats adjacent such spacer members 9. Thus, core 6 is supported in housing 2 in an efficiently sealed cantilever fashion along the upstream portion thereof with the downstream portion floating relative housing 2 so that the filter assembly is capable of enduring the excess vibration and shock to which such assembly might be exposed.

The invention claimed is:

1. A filter comprising an open-ended housing having an upstream dirty gas inlet and a downstream clean gas outlet; said housing having disposed therein a strip of glass fiber filter medium folded upon itself at longitudinally spaced intervals to provide a plurality of stacked pleats within said housing extending between opposite walls thereof and having successively alternating pleat fold-turns; a plurality of corrugated, thin metallic foil spacer members disposed within and extending along the lengths of said pleats to space the same; said spacer members having U-shaped channel members extending across and engaging the transverse edges of the spacer members adjacent the pleat fold-turns to round off said edges to minimize wear and tear of said fold-turns; alternate spacer members having a breadth greater than the breadth of a spaced pleat immediately adjacent thereto with the longitudinal side edges of said alternate spacer members being folded upon themselves to engage the longitudinal side edges of an immediately adjacent pleat therebetween to form longitudinal edge seals therealong; and a sealant of adhesive cement surrounding the upstream perimeter of said stacked pleats to seal said upstream perimeter with the upstream inner wall of said surrounding housing, the downstream perimeter of said stacked pleats floating relative said surrounding housing.

2. A filter comprising a strip of filter medium folded upon itself at longitudinally spaced intervals to provide a plurality of stacked pleats each having pleat-forming flanks; a plurality of corrugated spacer members disposed between said pleat-forming flanks and extending along the lengths of said pleats to space the same, alternate spacer members having a breadth greater than the breadth of a spaced pleat immediately adjacent thereto, the remaining spacer members having a breadth not greater than the breadth of the pleat with which they cooperate, said alternate spacer members having their longitudinal side edges folded upon themselves to provide an overlapping fold with the body of such spacer member to receive therebetween in sealing relationship the facing longitudinal side edges of the pleat-forming flanks of an immediately adjacent pleat having one of said remaining spacer members therebetween, whereby said remaining spacer members are each secured between the pleat-forming flanks of a pleat with the longitudinal edges of the flanks of the pleat secured in sealed relationship between the folded longitudinal side edges of an alternate spacer member.

3. The apparatus of claim 2, said filter including an open-ended housing having an upstream dirty gas inlet and a downstream clean gas outlet surrounding said stacked pleats formed by said strip of folded filter medium; and sealing means surrounding the upstream perimeter of said stacked pleats to seal the same with the inner upstream perimeter of said surrounding housing, the downstream perimeter of said stacked pleats floating relative said surrounding housing.

4. The apparatus of claim 2, and U-shaped channel members extending across and receiving in nesting relationship therewith the transverse edges of said spacer members adjacent said pleat fold-turns to round off said edges to minimize wear and tear of said fold-turns.

References Cited by the Examiner

UNITED STATES PATENTS

| | | | |
|---|---|---|---|
| 2,008,751 | 7/1935 | Davies | 55—500 X |
| 2,114,358 | 4/1938 | Schwartz. | |
| 2,764,258 | 9/1956 | Bub et al. | 55—521 |
| 2,884,091 | 4/1959 | Baldwin | 55—500 |
| 2,907,407 | 10/1959 | Engle et al. | 55—500 |
| 2,945,559 | 7/1960 | Buckman | 55—502 X |
| 2,960,262 | 11/1960 | Cavender | 223—98 |
| 3,146,197 | 8/1964 | Getzin | 55—497 X |

ROBERT F. BURNETT, *Primary Examiner.*